US011656069B2

(12) United States Patent
Conte et al.

(10) Patent No.: US 11,656,069 B2
(45) Date of Patent: May 23, 2023

(54) GRADING TOOLS

(71) Applicants: Massimo Conte, Milton (CA); Angelo Conte, Milton (CA)

(72) Inventors: Massimo Conte, Milton (CA); Angelo Conte, Milton (CA)

(*) Notice: Subject to any disclaimer, the term of this patent is extended or adjusted under 35 U.S.C. 154(b) by 0 days.

(21) Appl. No.: 17/509,609

(22) Filed: Oct. 25, 2021

(65) Prior Publication Data
US 2022/0128344 A1    Apr. 28, 2022

Related U.S. Application Data

(60) Provisional application No. 63/105,611, filed on Oct. 26, 2020.

(51) Int. Cl.
*G01B 5/28* (2006.01)
*G01B 5/06* (2006.01)

(52) U.S. Cl.
CPC ............. *G01B 5/285* (2013.01); *G01B 5/061* (2013.01)

(58) Field of Classification Search
CPC ........... G01B 5/285; G01B 5/061; G01B 3/50
USPC .......................................................... 33/533
See application file for complete search history.

(56) References Cited

U.S. PATENT DOCUMENTS

| | | | | |
|---|---|---|---|---|
| 928,492 A | * | 7/1909 | Brink | G01B 5/285 116/DIG. 35 |
| 1,283,761 A | * | 11/1918 | Hendricks | G01B 5/061 30/282 |
| 2,373,641 A | * | 4/1945 | Ackerson | G01C 9/24 33/385 |
| 2,394,137 A | * | 2/1946 | Barlow | G01B 5/063 33/838 |
| 3,678,670 A | | 7/1972 | Welz | |
| 4,067,117 A | | 1/1978 | Bernard | |
| 4,187,612 A | * | 2/1980 | Scott | G01B 11/0608 33/556 |
| 5,388,338 A | | 2/1995 | Majors | |
| 5,617,645 A | * | 4/1997 | Wick | G01B 11/27 250/559.23 |

(Continued)

FOREIGN PATENT DOCUMENTS

| | | |
|---|---|---|
| EP | 3246492 | 11/2017 |
| GB | 2278918 | 12/1994 |
| GB | 23715823 | 7/2002 |

OTHER PUBLICATIONS

Examination report issued in Canadian application No. 3,135,713 dated Mar. 22, 2023 (6 pages).

*Primary Examiner* — George B Bennett
(74) *Attorney, Agent, or Firm* — DLA Piper LLP US

(57) ABSTRACT

An apparatus to grade a surface is provided. The apparatus includes an elongated member with a straight edge to grade a surface. In addition, the apparatus includes a height gauge to attach to an end of the elongated member. The height gauge is to engage a border of the surface. Furthermore, the apparatus includes a connector to connect the height gauge to the elongated member. The apparatus also includes a first surface on the height gauge. The first surface is to engage a side wall of the border to grade the surface proximate to the side wall. The apparatus further includes a second surface on the height gauge offset from the straight edge by a distance. The second surface is to engage a top surface of the border such that the straight edge is to grade the surface at the distance below the top of the border.

20 Claims, 12 Drawing Sheets

(56) References Cited

U.S. PATENT DOCUMENTS

| | | | |
|---|---|---|---|
| 5,671,553 | A | 9/1997 | Burkhart |
| 6,408,532 | B1 * | 6/2002 | Keys ................. G01B 5/02 |
| | | | 33/522 |
| 6,412,185 | B1 | 7/2002 | Mills et al. |
| 6,988,561 | B1 | 1/2006 | Campbell |
| 7,322,229 | B2 * | 1/2008 | Wilhelm ............ G01B 11/306 |
| | | | 73/104 |
| 9,074,865 | B2 * | 7/2015 | Yamauchi ............ G01B 21/30 |
| 9,933,248 | B2 * | 4/2018 | Mariller ............... G01B 5/004 |
| 10,196,794 | B2 | 2/2019 | Green |
| 10,352,005 | B1 | 7/2019 | Mendendorp |
| 10,823,544 | B2 * | 11/2020 | Xue ................... G01B 5/061 |
| 2002/0129507 | A1 | 9/2002 | Vecchio |
| 2004/0244233 | A1 | 12/2004 | Johnson |
| 2006/0137204 | A1 * | 6/2006 | Yang .................. G01B 7/082 |
| | | | 33/832 |
| 2010/0202831 | A1 | 8/2010 | Saranga |
| 2014/0182154 | A1 * | 7/2014 | Tommy ............ E05D 11/0009 |
| | | | 33/533 |
| 2022/0235574 | A1 * | 7/2022 | Treadway ........... E04H 17/143 |

* cited by examiner

GRADING TOOLS

RELATED APPLICATIONS/PRIORITY CLAIM

This application claims the benefit under 35 USC 119(e) to: U.S. Provisional Patent Application Ser. No. 63/105,611 filed on Oct. 26, 2020 and entitled "Grading Tool" which is incorporated herein by reference in its entirety.

BACKGROUND

Grading a surface of aggregate material, such as dirt, sand, gravel, or other material may be carried out to provide a smooth surface as a base for additional surfacing. For example, the aggregate material may be used as a base for paving asphalt or concrete. In other examples, the aggregate surface may be used as a base for paver stones in interlocking surfaces, such as for driveways, walkways or patios. Paver stones used to form an interlocking locking surface typically have a uniform depth such that when the paver stones are placed on the level aggregate material, the top surfaces of the paver stones form a flat surface.

The grading of the aggregate surface may be carried out using various pieces of machinery including heavy machinery having various grading and leveling tools. For smaller surfaces or for precision grading near edges, a hand grading tool may be used to manually grade and level the surface. The tool typically used to grade a surface includes a straight edge to effectively scrape the aggregate material to form a flat smooth surface.

SUMMARY

In accordance with an aspect of the invention, there is provided an apparatus. The apparatus includes an elongated member with a straight edge to grade a surface. In addition, the apparatus includes a height gauge to attach to an end of the elongated member. The height gauge is to engage a border of the surface, the border raised above the surface. Furthermore, the apparatus includes a connector to connect the height gauge to the elongated member. The apparatus also includes a first surface on the height gauge. The first surface is to engage a side wall of the border to grade the surface to the side wall. The apparatus further includes a second surface on the height gauge offset from the straight edge by a distance. The second surface is to engage a top surface of the border such that the straight edge is grade the surface at the distance below the top of the border.

The connector may include a connector opening in the elongated member and a portion of the height gauge configured to be received in the connector opening.

The of the height gauge configured to be received in the connector opening may be secured in the connector opening via a friction fit.

The apparatus may further include a securing mechanism. The securing mechanism may include a pin to engage a first hole aligned to a second hole. The first hole may be disposed on the elongated member and the second hole may be disposed on the height gauge. The pin may be disposed in the height gauge. The pin may extend through the second hole into the first hole. Furthermore, the pin may be biased toward an extended position.

The height gauge may be flush with the elongated member when connected.

The apparatus may further include a handle disposed on the elongated member to drag the elongated member across the surface. The handle may be a handle opening through the elongated member.

The apparatus may further include a top level disposed on a top surface of the elongated member. The apparatus may further include a front level disposed on a front surface of the elongated member.

In accordance with another aspect of the invention, there is provided a method. The method involves connecting a height gauge to an elongated member. The method further involves engaging a side wall of the raised border with a first surface of the height gauge. In addition, the method involves engaging a top surface of the raised border with a second surface of the height gauge. Also, the method involves grading the surface with a straight edge of the elongated member at a distance below the top surface of the raised border. The straight edge is offset from the second surface by the distance.

Connecting the height gauge to the elongated member may involve inserting a portion of the height gauge into a connector opening in the elongated member.

The method may further involve securing the height gauge to the elongated member. Securing may involve inserting the portion into the connector opening to cause a friction fit.

Securing may involve engaging a first hole aligned to a second hole with a pin. The first hole may be disposed on the elongated member and the second hole may be disposed on the height gauge. The pin may be disposed in the height gauge. The pin may extend through the second hole into the first hole. The pin may be biased toward an extended position.

Grading the surface may involve dragging the straight edge across the surface along the raised border. Dragging may involve pulling the elongated member with a handle.

The method may further involve monitoring a level disposed on the elongated member during grading.

In accordance with an aspect of the invention, there is provided an apparatus. The apparatus includes a body. The apparatus further includes a first surface on the body. The first surface is to engage a side wall of a border to grade a surface proximate to the side wall. The apparatus also includes a second surface on the body to gauge a distance above the surface. The second surface is to engage a top surface of the border. In addition, the apparatus includes a connection mechanism to connect the body to an elongated member. The elongated member includes a straight edge to grade the surface. The straight edge is offset from the second surface by the distance The connection mechanism may include a portion of the height gauge configured to be received in a connector opening of the elongated member.

The apparatus may further include a securing mechanism to secure the body to the elongated member. The securing mechanism may be a friction fit. The securing mechanism may include a pin to engage a hole disposed on the elongated member. The pin may be biased toward an extended position to engage the hole.

The body may be flush with the straight edge of the elongated member when connected.

BRIEF DESCRIPTION OF THE DRAWINGS

Reference will now be made, by way of example only, to the accompanying drawings in which.

DETAILED DESCRIPTION

Figure 1:
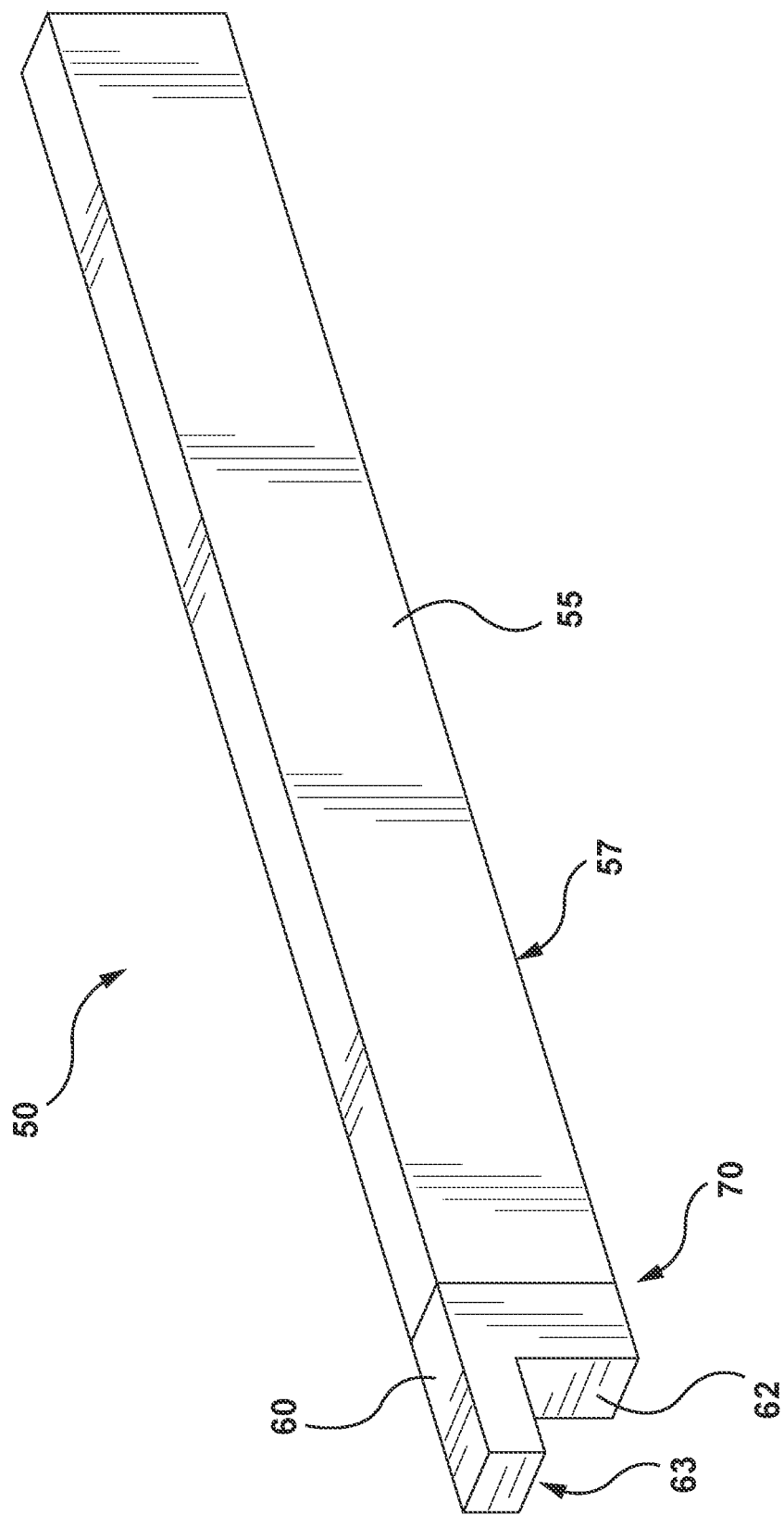
FIG. 1 is a perspective view of an example of an apparatus to grade a surface along a border.

As used herein, any usage of terms that suggest an absolute orientation (e.g. "top", "bottom", "up", "down", "left", "right", "low", "high", etc.) may be for illustrative convenience and refer to the orientation shown in a particular figure. However, such terms are not to be construed in a limiting sense as it is contemplated that various components will, in practice, be utilized in orientations that are the same as, or different than those described or shown.

Prior to paving or installing paver stones, a surface is generally graded to provide a smooth and flat finish once the pavement and/or paver stones are placed thereupon. In many applications, the surface to be graded is made from an aggregate material that may be graded using hand tools and/or heavy machinery for larger surfaces. For example, various rakes and straight edges may be used to push and pull the aggregate material to form a flat surface onto which the pavement or paver stones are installed. During the process of pushing and pulling the aggregate material across the surface, it is to be appreciated that the height of the surface may be raised by increasing the amount of aggregate material in an area or lowered by decreasing the amount of aggregate material in the area.

In some applications, pavement or paver stones may be installed on a surface bordered by another surface of a different height. For example, the border may include a curb, existing pavement, and/or existing paver stones. When installing the pavement or paver stones, the relative height of the aggregate surface to be graded may be graded to be a constant distance below the height of the border feature. Accordingly, by maintaining the constant height, the pavement installed on the aggregate surface may have a substantially uniform thickness along the border and be flush with the top of the border. Similarly, if paver stones are to be installed over the aggregate surface, the constant distance between the aggregate surface and the border surface may allow for substantially uniform paver stones to be installed flush with the top of the border surface to create a smooth transition from the border.

To achieve a substantially constant distance between the aggregate surface and the top surface of a border, the operator of the grading tool is to exercise care and judgement to not push or pull too much aggregate material away or into the areas adjacent to the border. In many instances, the operator of the grading tool is to make multiple measurements to ensure that the distance between the aggregate surface and the top surface of a border is substantially constant.

An apparatus is provided to facilitate the grading of an aggregate surface adjacent to a border such that the aggregate surface is maintained at a substantially constant height relative to the top surface of the border. In particular, the apparatus provides a solid height gauge that may be easily attached and detached to a grading tool. By providing a solid height gauge, it is to be appreciate by a person of skill in the art that the height may be maintained even if significant pressure is applied to the height gauge since there are no moving parts that may slip.

Referring to FIG. 1, a schematic representation of an apparatus 50 to grade a surface proximate to a border is generally shown. It is to be appreciated by a person of skill with the benefit of this description that the apparatus 50 may include additional features and components. For example, the apparatus 50 may also include various attachments for operation by an operator standing up, or connectors to connect to a motorized device to drag the apparatus along the surface. In addition, some of the components described below may be omitted in variations of the apparatus 50. In the present example, the apparatus 50 includes an elongated member 55 a height gauge 60, and a connector mechanism 70.

The elongated member 55 includes a straight edge 57 to grade a surface. In the present example, the surface to be graded is typically a surface of aggregate material such that dragging or pushing the elongated member 55 across the surface will cause the aggregate material be graded. The exact design of the elongated member 55 is not particularly limited. For example, the straight edge 57 of the elongated member 55 may be replaced with an attachment or other shape to grade the surface. For example, the straight edge 57 may be substituted with tines or teeth to loosen the aggregate material while grading in some examples. In other examples, the straight edge 57 may include multiple sections, such as a section to loosen the aggregate material followed by a flat section to leave a smooth aggregate surface. In other examples, the elongated member 55 may have a sawtooth structure to provide a sawtooth surface that is graded.

The material from which the elongated member 55 is constructed is not particularly limited. In the present example, the elongated member 55 is made from a lightweight metal, such as aluminum. The elongated member 55 may be solid or hollow in various examples. In some examples, alternative metals may be used such as steel, bronze, or other alloys that are typically corrosion resistant. In further examples, the elongated member 55 may also be made from plastic, fiberglass, or other composite materials having sufficient mechanical strength to grade the surface. By using plastics, the elongated member 55 may be made from various processes such as injection molding techniques or three-dimensional printing to allow for modifications and other features to be added to the apparatus 50, including some of the features discussed below in more detail.

The dimensions of the elongated member 55 are not particularly limited and may be varied depending on the application. It is to be appreciated that an elongated member 55 with longer dimensions will be able to grade a large surface area with a single pass; however, the grading process will use more force which may make it more difficult to grade the surface. In the present example, the elongated member 55 may be about 2.0 meters long, about 15 centimeters tall, and about 2.5 centimeters wide. It is to be appreciated by a person skilled in the art that these dimensions provide the ability to grade a wide swath of aggregate material while being able to be controlled by a single user. The cross section dimensions provide sufficient mechanical rigidity for many of the materials mentioned above. Accordingly, for materials with increased structure rigidity, the cross section may be smaller. Similarly, the length of the elongated member 55 may be increased in some applications where additional users or other mechanical devices may be assist in controlling the motion of the apparatus 50. Alternatively, the elongated member 55 may also have a shorter length for applications where a smaller swath of aggregate material is to be graded, such as for a narrow pathway.

The height gauge 60 is to attach to an end of the elongated member 55 using the connector mechanism 70. The height gauge 60 is to engage a border of the surface that is to be raised above the surface. The manner by which the height gauge 60 engages the border is not particularly limited. In the present example, the height gauge 60 may include fixed shapes such as a substantially square shape formed by the side surface 62 and the bottom surface 63 to engage a border. It is to be understood that for an aggregate surface at the border, any aggregate material buildup next to the raised border may result in an uneven installation, such as a raised paver stone along the border. Accordingly, the substantially square corners provide sharper edges for the installation of a top surface, such as paver stones.

In use, the side surface 62 of the height gauge 60 is to engage a side wall of the border. In the present example, it is to be assumed that the side wall of the border is to be substantially vertical. In other examples where the side wall of the border is to be sloped, the side surface 62 is to have a complementary slope to engage with the side wall of the border. Continuing with the present example where the side wall of the border is substantially vertical, the height gauge 60 is dimensioned such that the base of the height gauge 60 is proximate to the side wall of the border when the side surface 62 contacts the side wall of the border. It is to be appreciated by a person of skill with the benefit of this description that by positioning the base of the height gauge 60 proximate to the border of the surface, the base of the height gauge 60 may be used to grade the surface up to the border to provide a square corner. Accordingly, the apparatus 50 may be used to grade along the border without the use of a smaller tool to clean up the edges of the surface against the border.

The height gauge 60 also includes a bottom surface 63 that is substantially horizontal to engage the top surface of the border. In the present example, the bottom surface 63 is substantially horizontal and parallel with the straight edge 57. In particular, the surface 63 is offset from the straight edge 57 by a distance that represents the target height of the top surface of the border relative to the aggregate surface. Accordingly, the surface may be graded by the apparatus 50 until the surface 63 contacts the top of the border. At this point, the apparatus 50 can grade a surface up to a distance equal to the height below the top surface of the border. Accordingly, the height gauge 60 reduces the likelihood of grading the surface too deep. In the present example, the height gauge 60 includes the surface 62 and the surface 63 meeting at a substantially right angle to form a square. In other examples, the height gauge 60 may include other shapes and features that can mate with various border profiles or tracking or guiding mechanisms.

The material from which the height gauge 60 is constructed is not particularly limited and may be a plastic material that may be molded to provide a target height from the straight edge 57 to the bottom surface 63. In other examples, the height gauge 60 may be made from wood, a composite material, or a lightweight metal, such as aluminum. The height gauge 60 may be substantially solid or hollow in various examples. In some examples, alternative metals may be used such as steel, bronze, or other alloys that are typically corrosion resistant. By using plastics, the height gauge 60 may be made from various processes such as injection molding techniques or three-dimensional printing to allow for modifications and other features to be added to the apparatus 50, including some of the features discussed below in more detail.

Figure 2A:
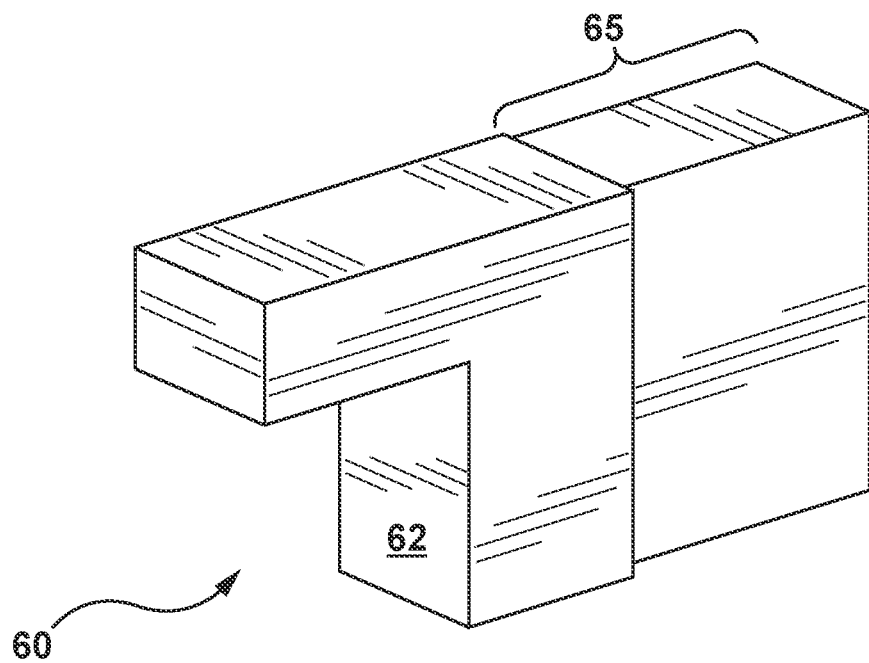
FIG. 2A is a perspective view of an example of a height gauge of the apparatus shown in FIG. 1.
Figure 2B:
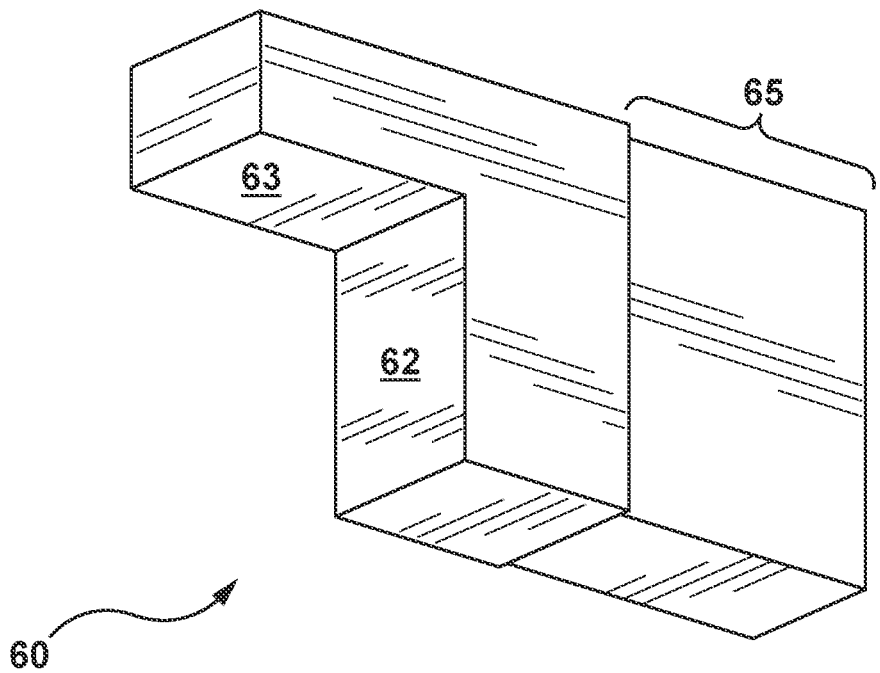
FIG. 2B is another perspective view of the example of the height gauge of the apparatus shown in FIG. 1.

Referring to FIGS. 2A and 2B, the body of a height gauge 60 is shown in greater detail. The dimensions of the height gauge 60 are not particularly limited and may be varied depending on the application and the dimensions of the raised border to which the height gauge 60 is to engage. It is to be appreciated that the width of the height gauge 60 may be substantially the same as the width of the elongated member 55, which is about 2.5 centimeters wide in the present example. Similarly, the height of the height gauge 60 may be substantially the same as the height of the elongated member 55, which is about 15 centimeters tall in the present example. In the present example, the height gauge 60 includes a portion 65 to extend into an opening of the elongated member 55. The length of the portion 65 is not limited. In the present example, the length of the portion 65 of the height gauge 60 that is to extend from the elongate member 55 is about 10 centimeters long and the surface 63 is about 5 centimeters long (i.e. from the surface 62 to the end of the height gauge 60). In the present example, the height gauge 60 has a fixed offset (i.e. the distance from the surface 63 to the bottom of the height gauge 60, which corresponds with the straight edge 57). It is to be appreciate by a person of skill with the benefit of this description that multiple interchangeable height gauges 60 may be used to obtain different offsets. The offset values are not particularly limited and may be about 50 mm, about 60 mm, or about 70 mm. Variations of the height gauge 60 are contemplated and the dimensions and shape may be varied to accommodate other applications or elongated members 55 with other dimensions.

Referring again to FIG. 1, the connector mechanism 70 is to connect the height gauge 60 to the elongated member 55. The manner by which the connector mechanism 70 secures the height gauge 60 to the elongated member 55 is not particularly limited and may include various mechanisms. The connector mechanism 70 is to allow for easy attachment of the height gauge 60 to the elongated member 55. Accordingly, an operator may change the height gauge 60 with another height gauge, such as one with a different height offset between the surface 63 and the straight edge 57 to accommodate different depths below the top surface of the border to the surface to be graded.

In the present example, the connector mechanism 70 includes an opening on in the elongated member 55 to receive the portion 65 of the height gauge 60. As shown in FIGS. 2A and 2B, the portion 65 of the height gauge 60 has smaller dimensions that than the rest of the body of the height gauge 60. The decrease in dimensions is generally to correspond with the thickness of the walls of the elongated member 55 about the opening such that when the height gauge 60 is attached to the elongated member 55, the outside surface is substantially flush between the height gauge 60 and the elongated member 55.

The connector mechanism 70 is also to rigidly secure the height gauge 60 to the elongated member 55 such that the height gauge 60 is in a fixed position relative to the elongated member 55 during use. The manner by which the height gauge 60 is secured to the elongated member 55 is not particularly limited and may include various mechanisms. In the present example, the portion 65 of the height gauge 60 may fit tightly in the opening of the elongated member 55 to form a friction fit. Accordingly, a friction fit mechanism provides a quick connecting mechanism to secure the height gauge 60 to the elongated member 55 to allow the height gauge 60 to the elongated member 55 to be connected and disconnected easily without tools.

In other examples, the connector mechanism 70 includes other securing mechanisms to secure the height gauge 60 to the elongated member 55. For example, the connector mechanism 70 may use various fasteners such as a screws or bolts to connect the height gauge 60 to the elongated member 55. In further examples, a magnetic coupling system may also be used to provide easy interchanging of the components.

Figure 3:
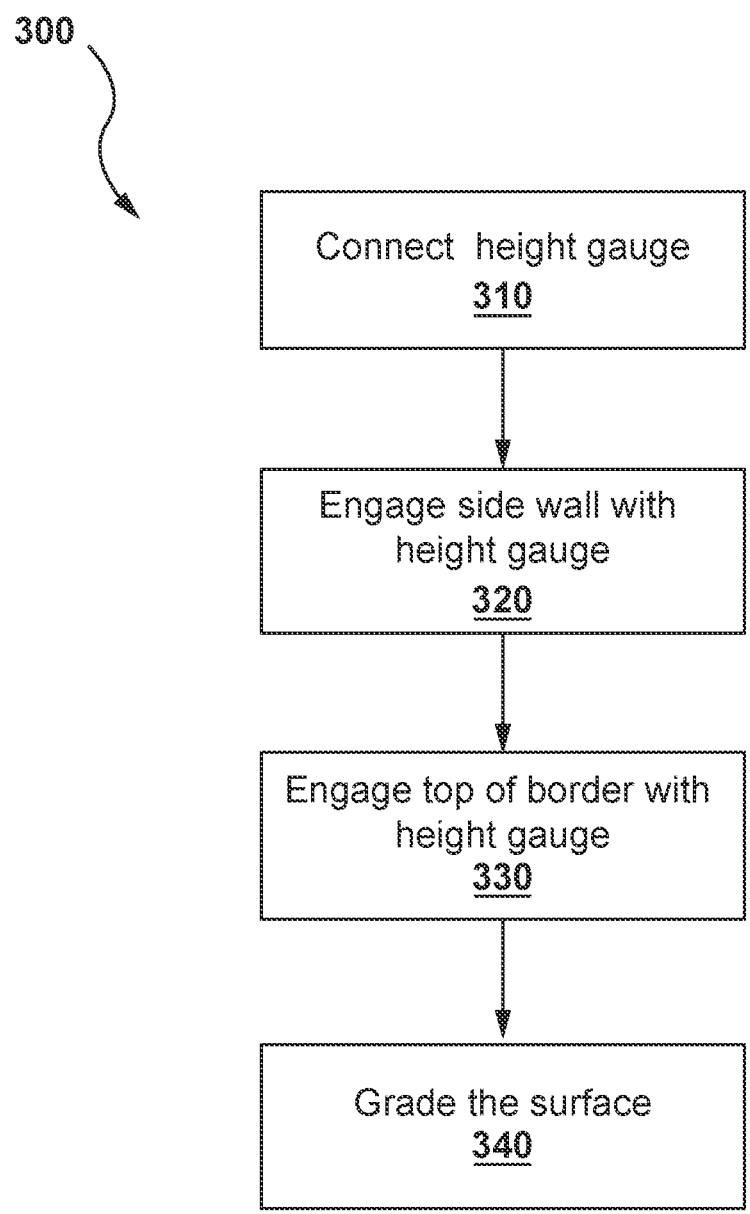
FIG. 3 is a flowchart of an example of a method of grading a surface along a border.

Referring to FIG. 3, a flowchart of a method of grading a surface along a raised border is generally shown at 300. In order to assist in the explanation of method 300, it will be assumed that method 300 may be performed by the apparatus 50. Indeed, the method 300 may be one way in which the apparatus 50 may be configured and used. Furthermore, the following discussion of method 300 may lead to a further understanding of the apparatus 50 and its components. In addition, it is to be emphasized, that method 300 may not be performed in the exact sequence as shown, and various blocks may be performed in parallel rather than in sequence, or in a different sequence altogether.

Beginning at block 310, a height gauge 60 is connected to an elongated member 55. The manner by which the height gauge 60 is connected to the elongated member 55 is not particularly limited and may involve using the connector mechanism 70 to rigidly connect the height gauge 60 and the elongated member 55 such that they remain locked in a relative position during use when uneven forces may be applied to the height gauge 60 and the elongated member 55.

Block 320 involves engaging the side wall of the raised border with the surface 62 of the height gauge 60. This process may involve pushing the apparatus against the side wall such that the aggregate material of the surface to be graded cannot be deposited along the raised border, which may ultimately cause uneven paver stones of the surface along the edge.

Next, block 330 comprises engaging the surface 63 of the height gauge 60 with the top surface of the raised border. It is understood that the starting height of the surface, as measured by the distance between the surface to be graded and the top surface of the raised border, is to be less than the offset between the surface 63 of the height gauge 60 and the straight edge 57. Accordingly, as the apparatus is moved, the aggregate surface being graded as in block 340 to remove excess aggregate material from an area until the surface 63 contacts the top surface of the raised border.

Figure 4:
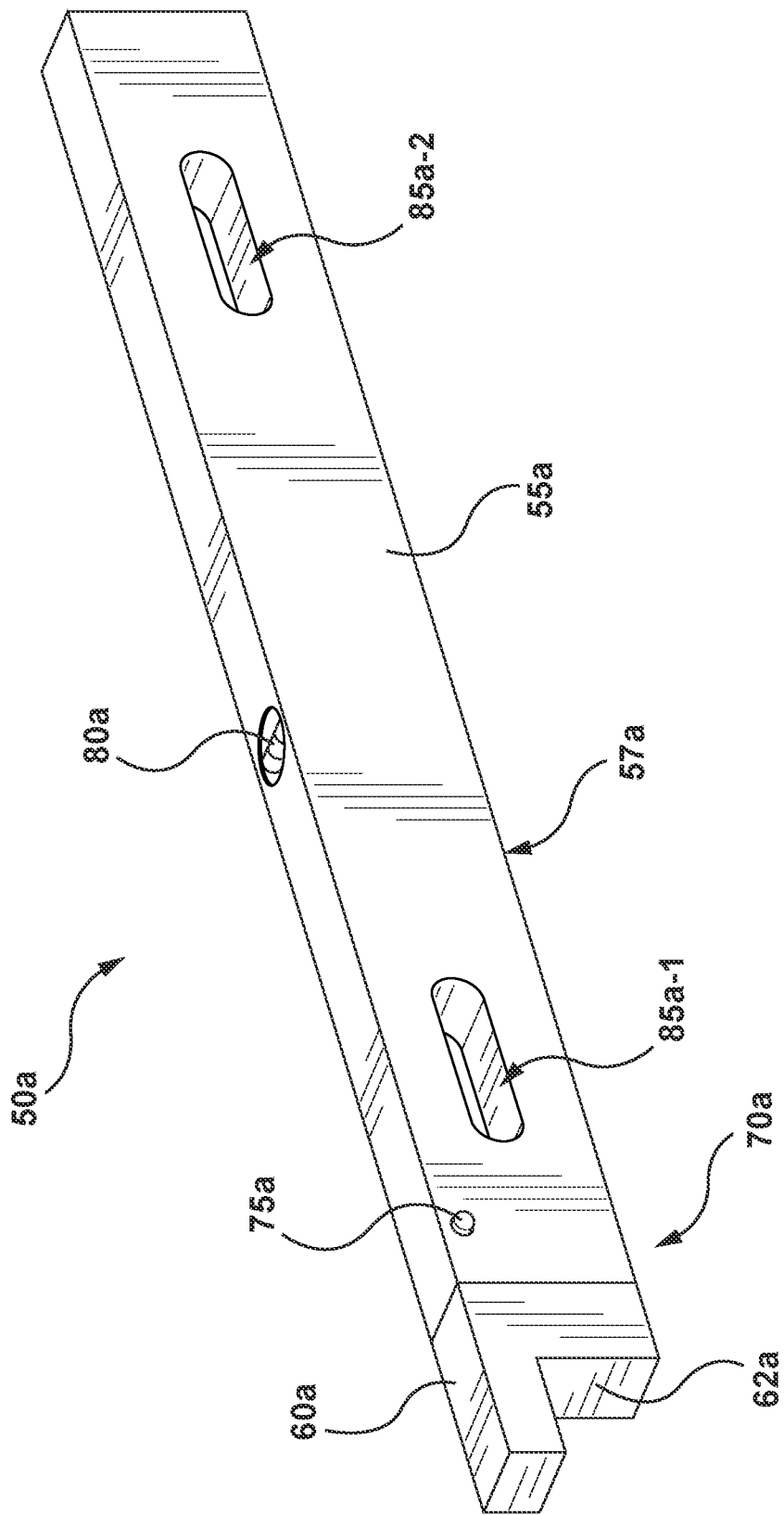
FIG. 4 is a perspective view of another example of an apparatus to grade a surface along a border.

Referring to FIG. 4, another schematic representation of an apparatus 50a to grade a surface proximate to a border is generally shown. Like components of the apparatus 50a bear like reference to their counterparts in the apparatus 50, except followed by the suffix "a". It is to be appreciated by a person of skill with the benefit of this description that the apparatus 50a may include additional features and components. In the present example, the apparatus 50a includes an elongated member 55a, a height gauge 60a, and a connector mechanism 70a.

The elongated member 55a includes a straight edge 57a to grade a surface. In the present example, the surface to be graded is typically a surface of aggregate material such that dragging or pushing the elongated member 55a across the surface will cause the aggregate material be graded in a similar manner to the elongated member 55. The material from which the elongated member 55a is constructed is not particularly limited and may include similar materials as those described above in connection with the elongated member 55.

The dimensions of the elongated member 55a are not particularly limited and may be varied depending on the application. It is to be appreciated that an elongated member 55a with longer dimensions will be able to grade a large surface area with a single pass; however, the grading process will use more force which may make it more difficult to grade the surface.

In the present example, the elongated member 55a includes a level 80a to allow an operator to assess and monitor the horizontal level of the apparatus 50a as it is being dragged or pushed across the surface. The level 80a is not particularly limited and may be disposed on the top surface of the elongated member 55a. It is to be appreciated by a person of skill with the benefit of this description that the level 80a may also be disposed on a front surface or back surface of the elongated member 55a. In further examples, multiple levels 80a may be disposed in multiple positions on the elongated member 55a. The level 80a is not particularly limited and may include any device, such as a bubble level as shown in FIG. 4. In other examples, the level 80a may be a digital levelling device.

Furthermore, the elongated member 55a includes handle openings 85a-1 and 85a-2 (generically, these handle openings are referred to herein as "handle opening 85a" and collectively they are referred to as "handle openings 85a") formed therein to extend through the body of the elongated member 55a. The handle opening 85a allows and operator to firmly hold the apparatus 50a as it is dragged or pushed along a surface. The handle openings 85a may be substituted with a handle extending from the elongated member 55a that is either attached or integrally formed with the elongated member 55a. For example, the handle may be another elongated member extending substantially vertical or at an angle to allow for an operator to use the apparatus 50a from a standing position.

The height gauge 60a is to attach to an end of the elongated member 55a using the connector mechanism 70a. The height gauge 60a is to engage a border of the surface that is to be raised above the surface. The manner by which the height gauge 60a engages the border is not particularly limited and may operate in substantially the same way as the height gauge 60 when attached to the elongated member 55.

Figure 5A:
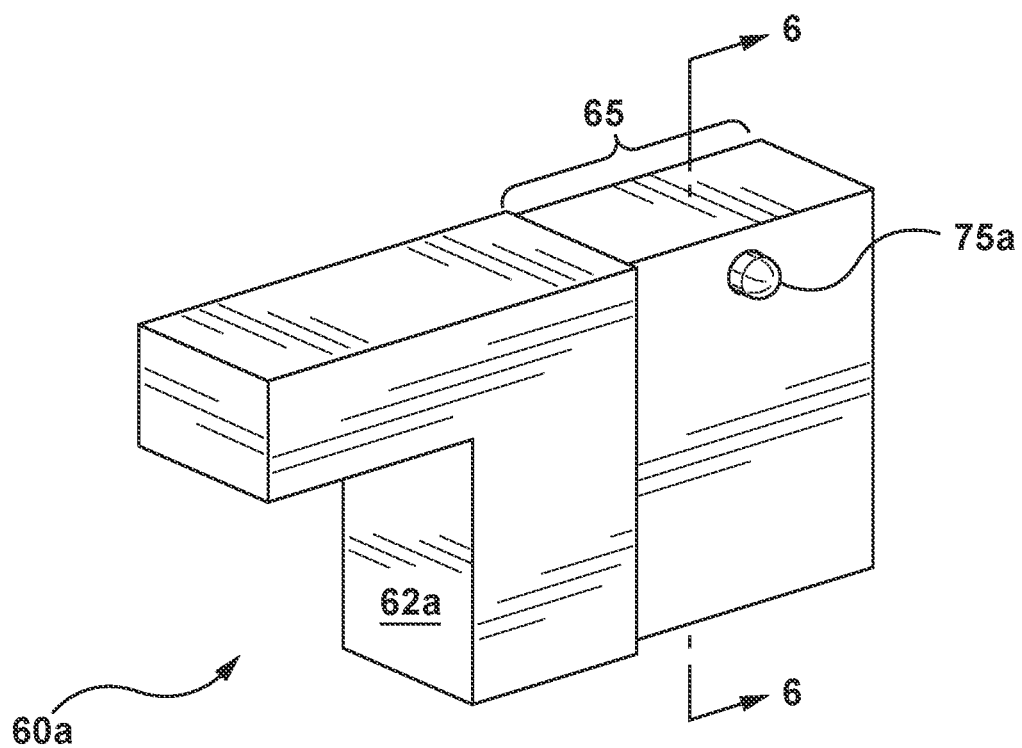
FIG. 5A is a perspective view of an example of a height gauge of the apparatus shown in FIG. 4.
Figure 5B:
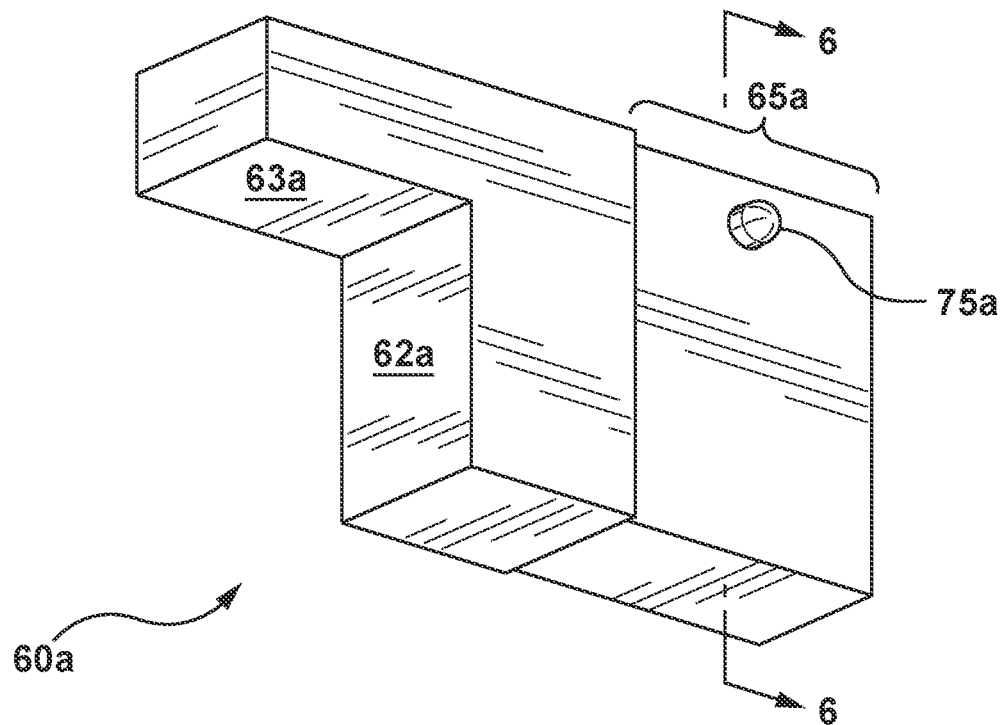
FIG. 5B is another perspective view of the example of the height gauge of the apparatus shown in FIG. 4.

Referring to FIGS. 5A and 5B, the body of a height gauge 60a is shown in greater detail. The dimensions of the height gauge 60a are not particularly limited and may be varied depending on the application and the dimensions of the raised border to which the height gauge 60a is to engage. It is to be appreciated that the width of the height gauge 60a may be substantially the same width and height of the elongated member 55a. The portion 65a of the height gauge 60a to extend into the opening of the elongated member 55a may be similar in dimensions as the portion 65 of the height gauge 60. Variations of the height gauge 60a are contemplated and the dimensions may be varied to accommodate other applications or elongated members 55a with other dimensions.

The connector mechanism 70a is to connect the height gauge 60a to the elongated member 55a. The manner by which the connector mechanism 70a secures the height gauge 60a to the elongated member 55a is not particularly limited and may include various mechanisms. The connector mechanism 70a is to allow for easy attachment of the height gauge 60a to the elongated member 55a. Accordingly, an operator may change the height gauge 60a with another height gauge, such as one with a different distance between the surface 63a and the straight edge 57a to accommodate different target depths of the surface to be graded below the top surface of the border.

In the present example, the connector mechanism 70a includes an opening on in the elongated member 55a to receive the portion 65a of the height gauge 60a. As shown in FIG. 2, the portion 65a of the height gauge 60a has smaller dimensions that than the rest of the body of the height gauge 60a. The decrease in dimensions is generally to correspond with the walls of the opening in the elongated member 55a such that when the height gauge 60a is attached to the elongated member 55a, the outside surface is substantially flush between the height gauge 60a and the elongated member 55a. Furthermore, in the present example, the height gauge 60a includes a pin 75a to extend through a hole in the height gauge 60a and a hole in the elongated member 55a to secure the height gauge 60a relative to the elongated member 55a In the present example, the connector mechanism 70a is to rigidly secure the height gauge 60a to the elongated member 55a such that the height gauge 60a is in a fixed position relative to the elongated member 55a during use. It is to be understood by a person of skill with the benefit of this description that the connector mechanism 70a is to have sufficient mechanical rigidity to secure the height gauge 60a to the elongated member 55a when subjected to typical forces used to grade an aggregate material and that the forces involved may depend on the type of material being graded. In the present example, the connector mechanism 70a includes a pin 75a to engage a hole in the body of the height gauge 60a and another hole in a wall of the elongated member 55a. In particular, the pin 75a is dimensioned to fit tightly in the holes to reduce relative motion between the height gauge 60a and the elongated member 55a.

Figure 6A:
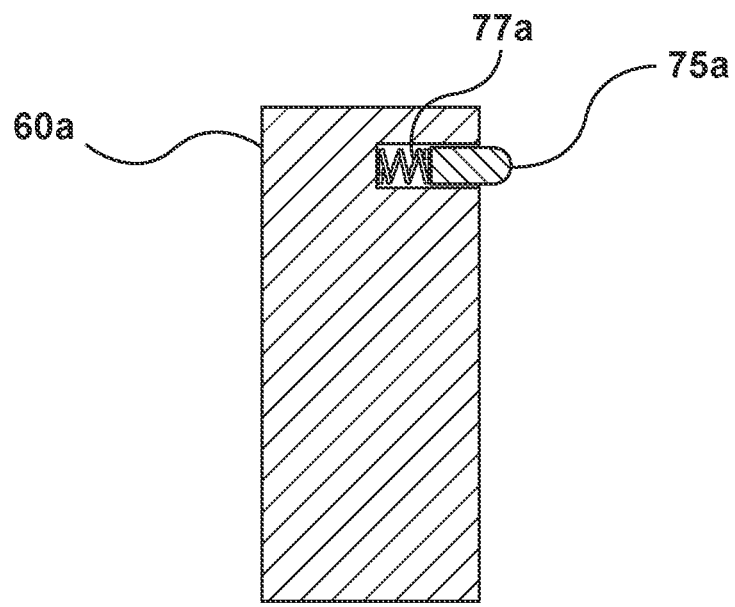
FIG. 6A is a cross sectional view the example of the height gauge shown in FIGS. 5A and 5B along the plane 6-6 with a pin in the extended position.
Figure 6B:
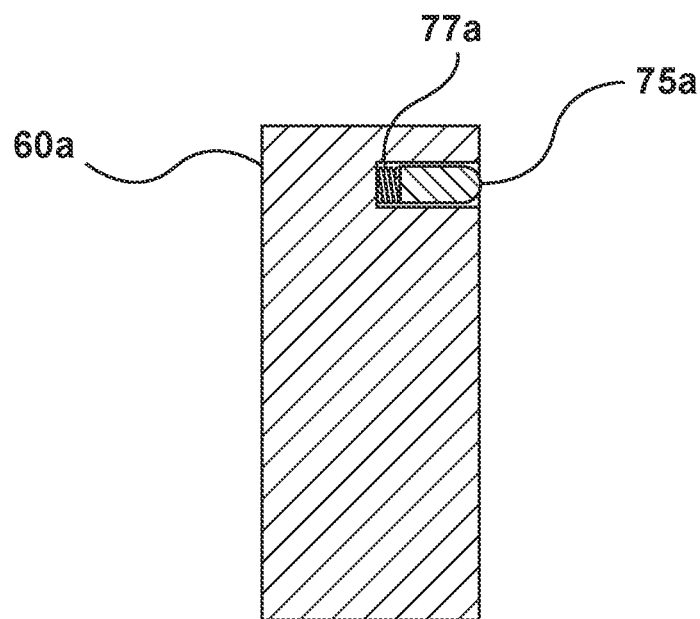
FIG. 6B is a cross sectional view the example of the height gauge shown in FIGS. 5A and 5B along the plane 6-6 with a pin in the retracted position.

Referring to FIGS. 6A and 6B, the pin 75a is disposed within the height gauge 60a. The pin 75a and configured to fit into a hole in the height gauge 60a. The pin 75a may then be aligned to a hole in wall of the elongated member 55a into which the portion 65a of the height gauge 60a is to be inserted. In the present example, the pin 75a is moveable between an extended position as shown in FIG. 6A and a retracted position as shown in FIG. 6B. The pin 75a is also connected to a biasing system, such as a spring 77a in the present example. In other examples, the spring 77a may be substituted with another resiliently deformable material, to urge the pin toward the extended position. Accordingly, the pin 75a may be manually depressed to the retracted position to unlock the height gauge 60 from the elongated member 55a to allow for easy and quick detachment.

Figure 7:
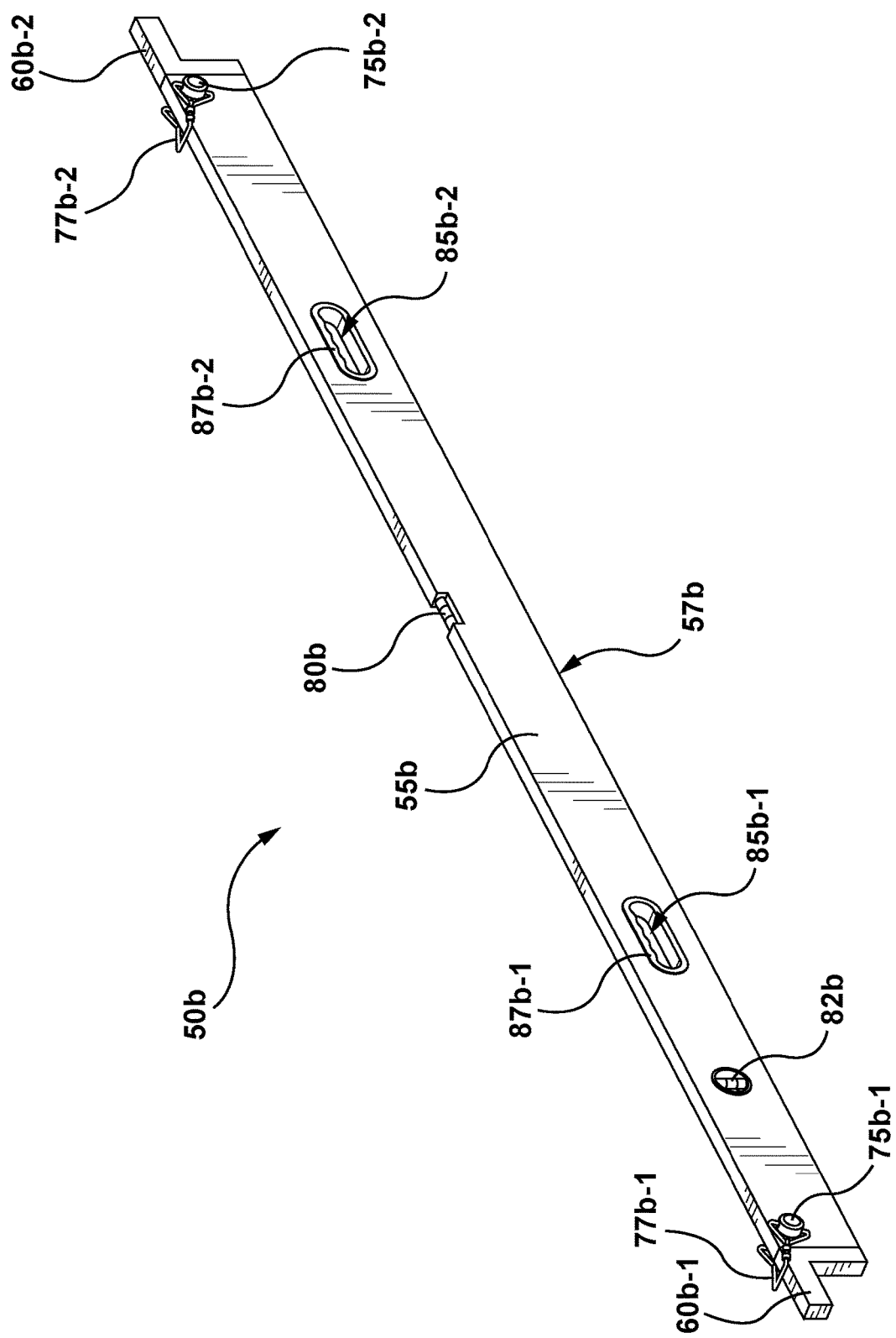
FIG. 7 is a perspective view of another example of an apparatus to grade a surface along a border.

Referring to FIG. 7, another schematic representation of an apparatus 50b to grade a surface proximate to a border is generally shown. Like components of the apparatus 50b bear like reference to their counterparts in the apparatus 50a, except followed by the suffix "b". It is to be appreciated by a person of skill with the benefit of this description that the apparatus 50b may include additional features and components. In the present example, the apparatus 50a includes an elongated member 55b, height gauges 60b-1 and 60b-2 (generically, these height gauges are referred to herein as "height gauge 60b" and collectively they are referred to as "height gauges 60b"), pins 75b-1 and 75b-2 (generically, these pins are referred to herein as "pin 75b" and collectively they are referred to as "pins 75b), and clips 77b-1 and 77b-2 (generically, these clips are referred to herein as "clip 77b" and collectively they are referred to as "clips 77b").

The elongated member 55b includes a straight edge 57b to grade a surface. In the present example, the surface to be graded is typically a surface of aggregate material such that dragging or pushing the elongated member 55b across the surface will cause the aggregate material be graded in a similar manner to the elongated member 55a. The material from which the elongated member 55b is constructed is not particularly limited and may include similar materials as those described above in connection with the elongated member 55a.

In the present example, the elongated member 55b includes a level 80b to allow an operator to assess and monitor the horizontal level of the apparatus 50b as it is being dragged or pushed across the surface similar to the operation of the level 80a. In addition, the elongated member 55b includes a vertical level 82b disposed on the elongated member 55b, such as on a front surface. The vertical level 82b is to check the plumb true level of a vertical structure such as a wall. It is to be appreciated by a person of skill with the benefit of this description that the level 82b provides additional functionality to the apparatus 50b when used at a worksite where vertical structures are built in addition to grading of the surface.

Figure 8:
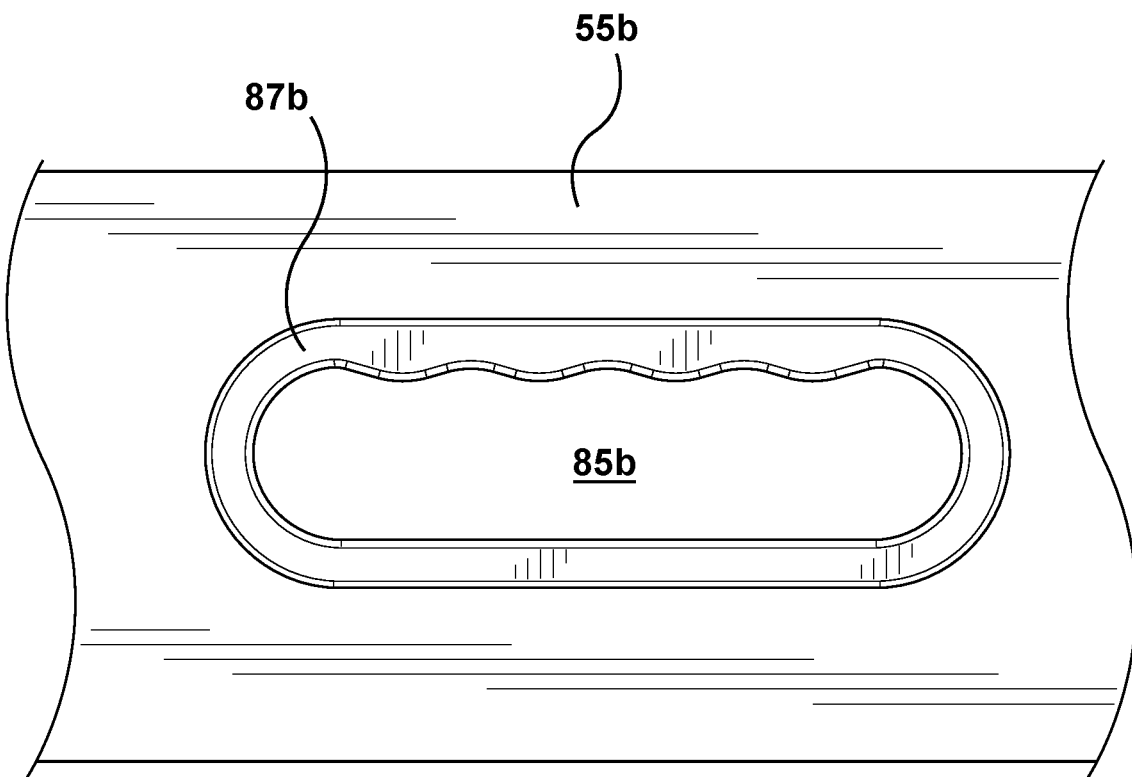
FIG. 8 is a view of an example of a handle of the apparatus shown in FIG. 7.

The elongated member 55b also includes handle openings 85b-1 and 85b-2 (generically, these handle openings are referred to herein as "handle opening 85b" and collectively they are referred to as "handle openings 85b") formed therein. The handle openings 85b allow and operator to firmly hold the apparatus 50b as it is dragged or pushed along a surface. Referring to FIG. 8, each of the handle openings 85b may be covered with a handle grip 87b to improve comfort during use. In addition, the handle grips 87b may improve the grip of the user.

In the present example, the height gauges 60b is to attach to opposite ends of the elongated member 55b. Each height gauge 60b is to engage a border of the surface that is to be raised above the surface. The manner by which each height gauge 60b engages the border is not particularly limited and may operate in substantially the same way as the height gauge 60 when attached to the elongated member 55.

Figure 9:
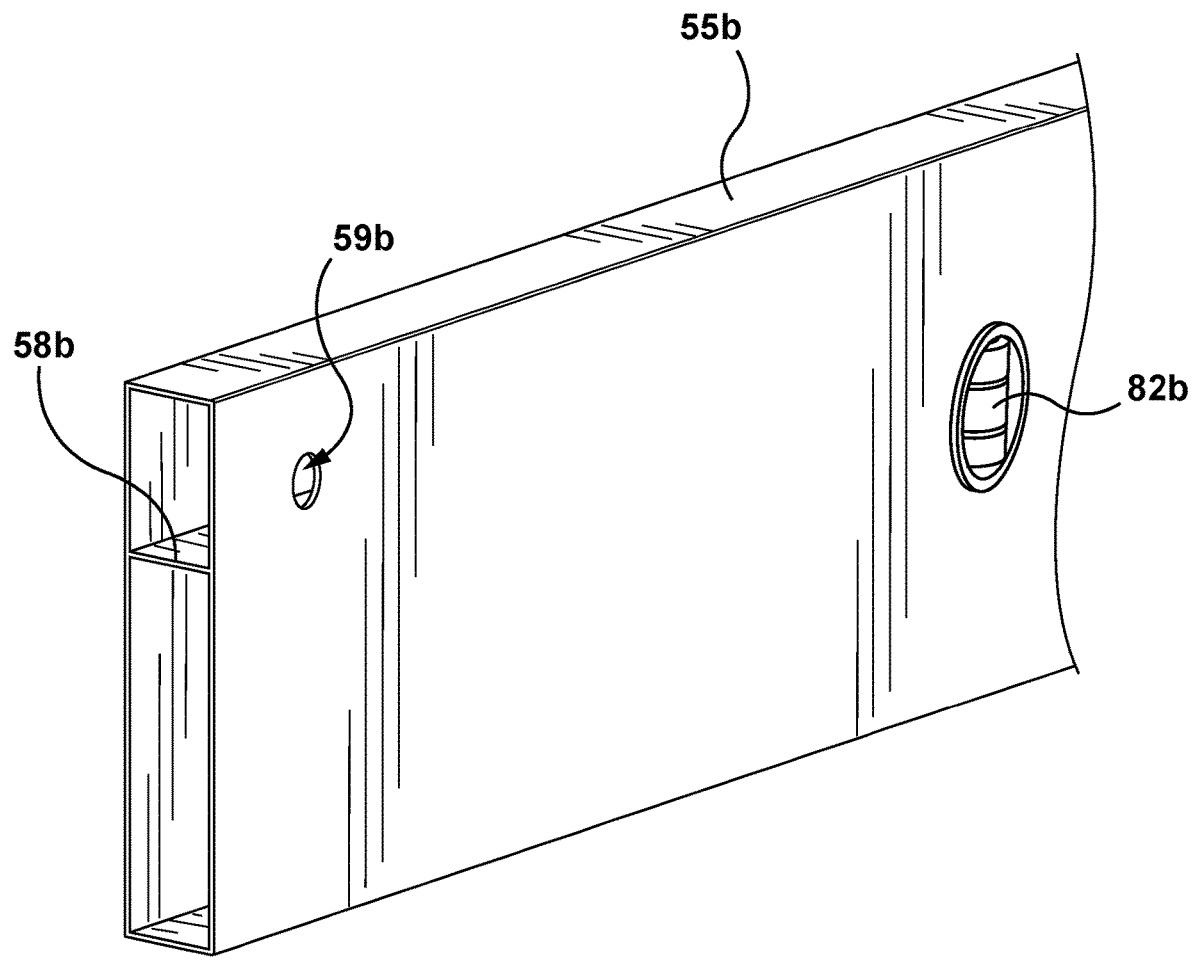
FIG. 9 is a view of an example of an end of the elongated member of the apparatus shown in FIG. 7.
Figure 10:
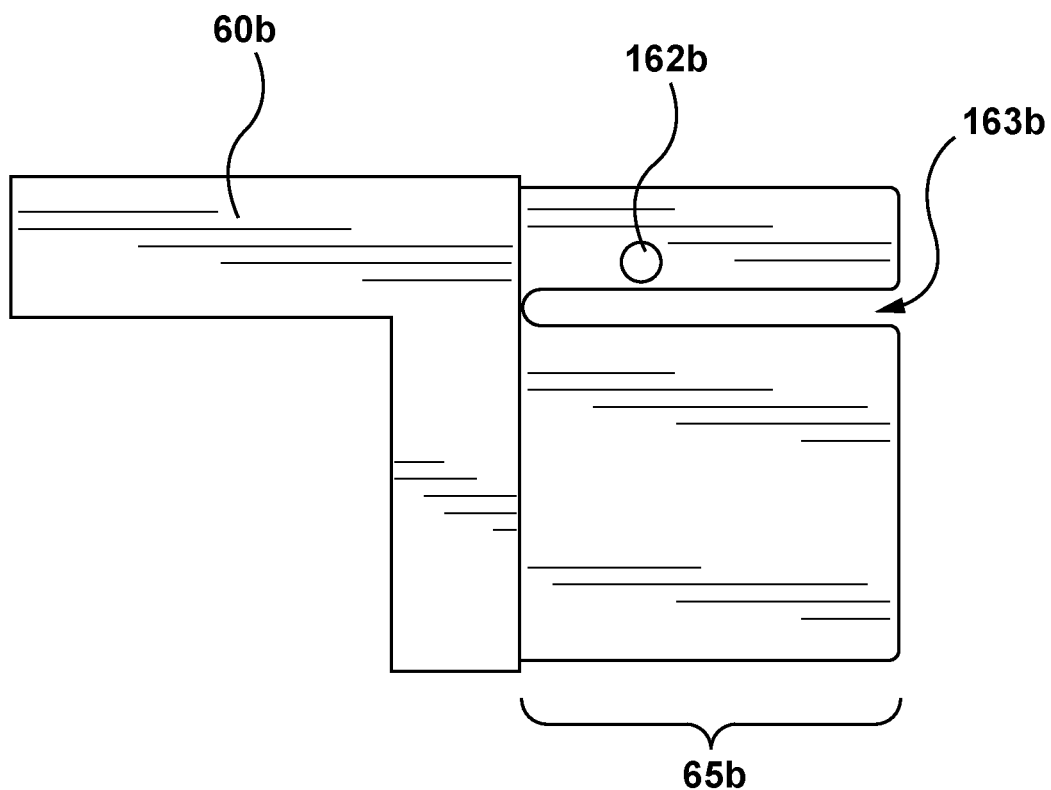
FIG. 10 is a side view of an example of a height gauge of the apparatus shown in FIG. 7.

In the present example, the elongated member 55b has an opening at each end as shown in FIG. 9. Referring to FIG. 10, the portion 65b of the height gauge 60b is to be inserted into the opening. The elongated member 55b further includes an internal support 58b to provide additional rigidity to the elongated member 55b. The internal support 58b is a cross beam along the length of the hollow elongated member 55b. In other examples, different support structures may be incorporated into the elongated member 55b, such as periodic cross beams, thicker walls, or a filler material. To accommodate the internal support 58b, each height gauge 60b includes a complementary feature, such as the slot 163b. In the present example, the slot 163b is dimensioned to fit tightly to engage the internal support 58b and provide an additional friction fit.

In the present example, the width of the height gauge 60b may be substantially the same as the width of the elongated member 55b, which is about 1.5 centimeters wide in the present example. Similarly, the height of the height gauge 60b may be substantially the same as the height of the elongated member 55b, which is about 10 centimeters tall in the present example. In the present example, the height gauge 60b includes a portion 65 to extend into an opening of the elongated member 55b. In the present example, the length of the portion 65b of the height gauge 60b that is to extend from the elongate member 55b is about 7.5 centimeters long and the surface 63b is about 7.5 centimeters long (i.e. from the surface 62b to the end of the height gauge 60b). In the present example, the height gauge 60b has a fixed offset (i.e. the distance from the surface 63b to the bottom of the height gauge 60b, which corresponds with the straight edge 57b). It is to be appreciate by a person of skill with the benefit of this description that multiple interchangeable height gauges 60b may be used to obtain different offsets. The offset values are not particularly limited and may be about 50 mm, about 60 mm, or about 70 mm.

Figure 11A:
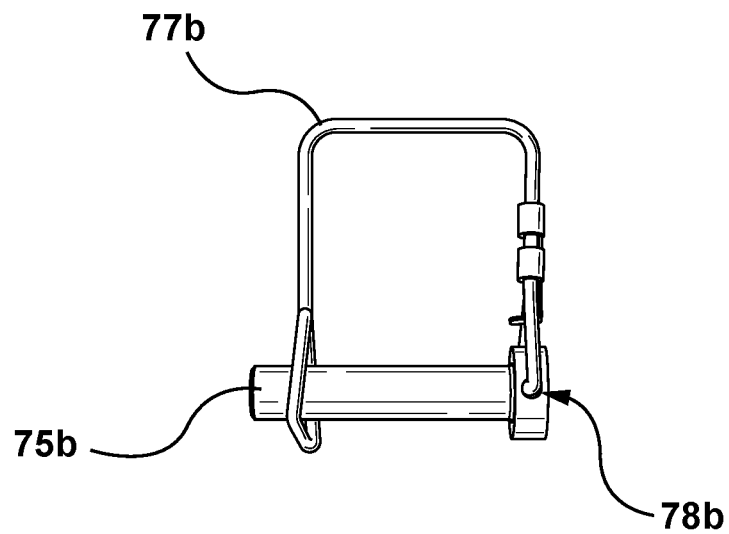
FIG. 11A is a view the example of a pin and a clip in the closed position of the apparatus shown in FIG. 7.
Figure 11B:
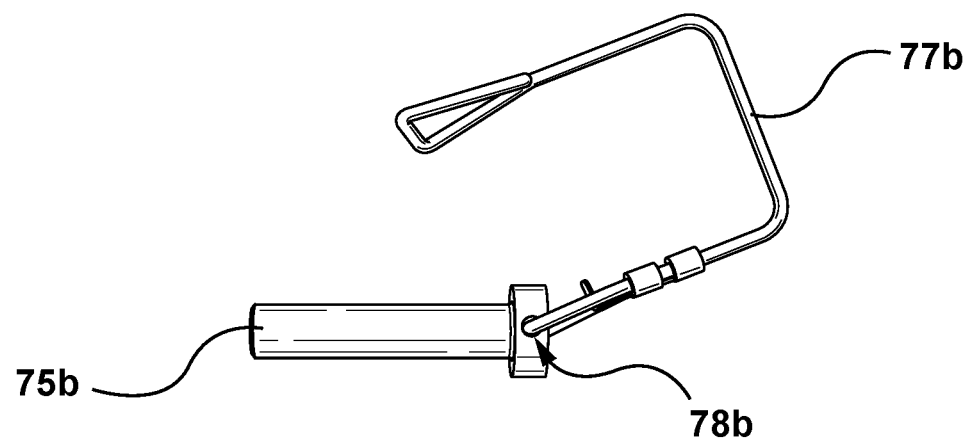
FIG. 11B is a view the example of a pin and a clip in the open position of the apparatus shown in FIG. 7.
Figure 12A:
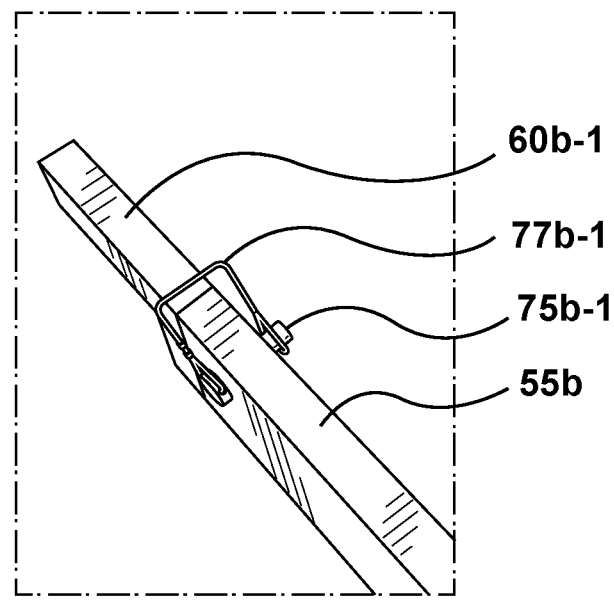
FIG. 12A is a view the example of an end of the apparatus shown in FIG. 7 with the clip in the closed position.
Figure 12B:
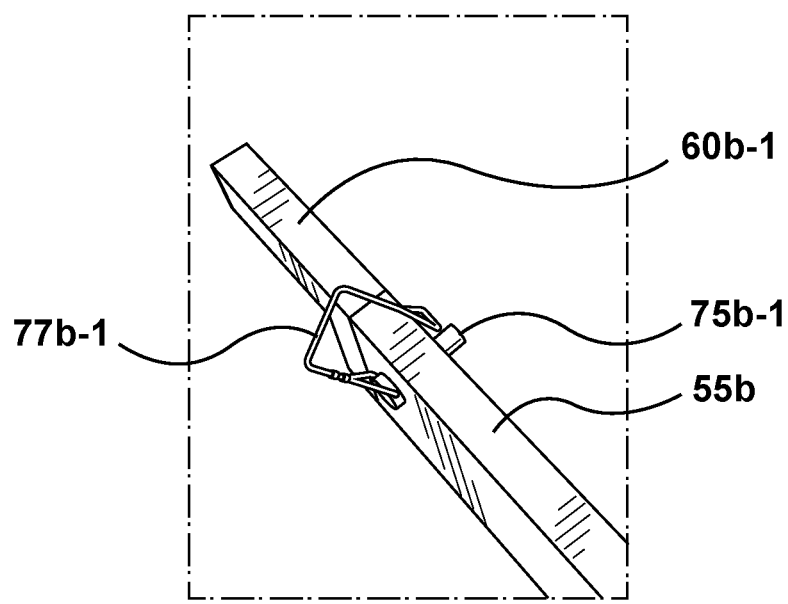
FIG. 12B is a view the example of an end of the apparatus shown in FIG. 7 with the clip in the open position.

Referring to FIGS. 11A and 11B, pins 75b are used to secure the height gauge 60b to the elongated member 55b. In the present example, each pin 75b is to extend through the opening 59b in the elongated member 55b and the hole 162b through the body of the height gauge and an opening on the opposite side of the elongated member. In the present example, each pin 75b includes a clip 77b to secure the pin 75b in place. The clip 77b may be pivotally attached to the pin 75b such that it may rotate about a pivot point between a closed position (shown in FIG. 11A) to lock the pin 75b when inserted through the elongated member 55b and the height gauge 60b and an open position (shown in FIG. 11B) to allow for insertion and removal. FIGS. 12A and 12B illustrate the pin 75b in use to secure the height gauge 60b to the elongated member 55b.

It is to be appreciated by a person of skill with the benefit of this description that the height gauges 60b at opposite end of the apparatus 50b allow for both edges of a surface to be graded simultaneously. Accordingly, the dimensions of the elongated member 55b are not particularly limited and may be varied depending on the application, such as the width of the surface to be graded. In the present example, the elongated member 55b may be about 2.1 meters long, about 10 centimeters tall, and about 1.5 centimeters wide. In other examples, the dimensions may be larger or smaller.

Various advantages will not become apparent to a person of skill in the art. In particular, the apparatus 50 may be used to grade various aggregate surfaces having a border. By selecting the height gauge 60 with the correct distance, the apparatus 50 may be used to grade the surface with a high degree of uniformity and precision such that when paver stones are place over the aggregate surface, they can be flush with a border. As an example, the surface may be used as a base for an interlocking driveway and the border may be an edge of a road. Accordingly, by selecting a height gauge 60 substantially close to the thickness of the paver stones, the surface may be graded and the paver stones easily installed to the target height to be flush with the road. Furthermore, by allowing for relatively easy attachment and detachment, multiple border heights may be accommodated by the present example. In addition, the rugged design and fixed size of the height gauge 60 allows for an operator to apply larger forces without recalibrating height settings periodically.

It should be recognized that features and aspects of the various examples provided above may be combined into further examples that also fall within the scope of the present disclosure.

What is claimed is:

1. An apparatus comprising:
   an elongated member with a straight edge to grade a surface;
   a height gauge to attach to an end of the elongated member, wherein the height gauge is to engage a border of the surface, the border raised above the surface;
   a connector to connect the height gauge to the elongated member;
   a first surface on the height gauge, the first surface to engage a side wall of the border to grade the surface proximate to the side wall; and
   a second surface on the height gauge offset from the straight edge by a distance, the second surface to engage a top surface of the border such that the straight edge is to grade the surface at the distance below the top of the border.

2. The apparatus of claim 1, wherein the connector comprises a connector opening in the elongated member and a portion of the height gauge configured to be received in the connector opening.

3. The apparatus of claim 2, wherein the portion is secured in the connector opening via a friction fit.

4. The apparatus of claim 2, wherein the connector includes a securing mechanism to secure the height gauge to the elongated member.

5. The apparatus of claim 4, wherein the securing mechanism includes a pin to engage a first hole aligned to a second hole, wherein the first hole is formed in the elongated member and the second hole is formed in the height gauge.

6. The apparatus of claim 5, wherein the pin is disposed in the height gauge, the pin to extend through the second hole into the first hole.

7. The apparatus of claim 6, wherein the pin is biased toward an extended position.

8. The apparatus of claim 4, wherein the securing mechanism includes a pin to extend through the elongated member and height gauge.

9. The apparatus of claim 8, wherein further comprising a clip to secure the pin in place.

10. The apparatus of claim 9, wherein the clip is rotatable connected to the pin, wherein the clip is rotatable between a first position to hold the pin and a second position to allow the pin to be removed or inserted through the elongated member and height gauge.

11. The apparatus of claim 1, wherein the height gauge is flush with the elongated member when connected.

12. The apparatus of claim 1, further comprising a handle disposed on the elongated member to drag the elongated member across the surface.

13. The apparatus of claim 12, wherein the handle is a handle opening through the elongated member.

14. The apparatus of claim 1, further comprising a horizontal level disposed on a top surface of the elongated member.

15. The apparatus of claim 1, wherein the elongated member is hollow.

16. The apparatus of claim 15, further comprising an internal support disposed within the elongated member along a length of the elongated member.

17. A method of grading a surface along a raised border, the method comprising:
- connecting a height gauge to an elongated member;
- engaging a side wall of the raised border with a first surface of the height gauge;
- engaging a top surface of the raised border with a second surface of the height gauge; and
- grading the surface with a straight edge of the elongated member at a distance below the top surface of the raised border, wherein the straight edge is offset from the second surface by the distance.

18. The method of claim 17, wherein connecting the height gauge to the elongated member comprises inserting a portion of the height gauge into a connector opening in the elongated member.

19. The method of claim 18, further comprising securing the height gauge to the elongated member, wherein securing comprises inserting the portion into the connector opening to cause a friction fit.

20. An apparatus comprising:
- a body;
- a first surface on the body, the first surface to engage a side wall of a border to grade a surface proximate to the side wall;
- a second surface on the body to gauge a distance above the surface, the second surface to engage a top surface of the border; and
- a connection mechanism to connect the body to an elongated member, wherein the elongated member includes a straight edge to grade the surface, wherein the straight edge is offset from the second surface by the distance.

* * * * *